(12) United States Patent
Lewis et al.

(10) Patent No.: US 7,072,916 B1
(45) Date of Patent: Jul. 4, 2006

(54) INSTANT SNAPSHOT

(75) Inventors: Blake Lewis, Palo Alto, CA (US); John K. Edwards, Sunnyvale, CA (US); Srinivasan Viswanathan, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 161 days.

(21) Appl. No.: 09/642,061

(22) Filed: Aug. 18, 2000

(51) Int. Cl.
*G06F 12/00* (2006.01)

(52) U.S. Cl. .......................... 707/205; 707/1; 711/161

(58) Field of Classification Search ................ 707/1, 707/200–205; 11/161; 711/161–162; 767/250, 767/204, 262
See application file for complete search history.

(56) References Cited

U.S. PATENT DOCUMENTS

| | | |
|---|---|---|
| 4,527,232 A | 7/1985 | Bechtolsheim |
| 4,742,447 A | 5/1988 | Duvall et al. |
| 4,742,450 A | 5/1988 | Duvall et al. |
| 4,761,785 A | 8/1988 | Clark et al. |
| 4,875,159 A | 10/1989 | Cary et al. |
| 4,937,763 A | 6/1990 | Mott ........................... 364/550 |
| 5,008,786 A | 4/1991 | Thatte |
| 5,043,876 A | 8/1991 | Terry |
| 5,067,099 A | 11/1991 | McCown et al. ........... 364/550 |
| 5,088,081 A | 2/1992 | Farr |
| 5,144,659 A | 9/1992 | Jones |
| 5,146,588 A | 9/1992 | Crater et al. |
| 5,155,835 A | 10/1992 | Belsan |
| 5,163,131 A | 11/1992 | Row et al. |
| 5,163,148 A | 11/1992 | Walls |
| 5,195,100 A | 3/1993 | Katz et al. |
| 5,218,695 A | 6/1993 | Noveck et al. |
| 5,218,696 A | 6/1993 | Baird et al. |
| 5,222,217 A | 6/1993 | Blount et al. |
| 5,235,601 A | 8/1993 | Stallmo et al. |
| 5,274,799 A | 12/1993 | Brant et al. |
| 5,274,807 A | 12/1993 | Hoshen et al. |
| 5,297,265 A | 3/1994 | Frank et al. |
| 5,305,326 A | 4/1994 | Solomon et al. |
| 5,315,602 A | 5/1994 | Noya et al. |

(Continued)

FOREIGN PATENT DOCUMENTS

EP 0 462 917 A2 12/1991

(Continued)

OTHER PUBLICATIONS

David Hitz, James Lau, Michael Malcolm, File System Design for an NFS File Server Appliance, Technical Report 3002, Jan. 19, 1994.*

(Continued)

*Primary Examiner*—Greta Robinson
*Assistant Examiner*—Miranda Le
(74) *Attorney, Agent, or Firm*—Swernofsky Law Group PC

(57) ABSTRACT

An improved method and apparatus for creating a snapshot of a file system. A record of which blocks are being used by a snapshot is included in the snapshot itself, allowing effectively instantaneous snapshot creation and deletion. The state of the active file system is described by a set of metafiles; in particular, a bitmap (henceforth the "active map") describes which blocks are free and which are in use. The inode file describes which blocks are used by each file, including the metafiles. The inode file itself is described by a special root inode, also known as the "fsinfo block". The system begins creating a new snapshot by making a copy of the root inode. This copy of the root inode becomes the root of the snapshot.

27 Claims, 3 Drawing Sheets

U.S. PATENT DOCUMENTS

| | | | |
|---|---|---|---|
| 5,317,731 A * | 5/1994 | Dias et al. ............... | 707/8 |
| 5,333,305 A | 7/1994 | Neufeld | |
| 5,335,235 A | 8/1994 | Arnott | |
| 5,357,509 A | 10/1994 | Ohizumi | |
| 5,379,417 A | 1/1995 | Lui et al. | |
| 5,490,248 A | 2/1996 | Dan et al. | |
| 5,502,836 A | 3/1996 | Hale et al. | |
| 5,649,152 A | 7/1997 | Ohran et al. | |
| 5,668,943 A | 9/1997 | Attanasio et al. | |
| 5,668,958 A | 9/1997 | Bendert et al. | |
| 5,675,726 A | 10/1997 | Hohenstein et al. | |
| 5,678,006 A | 10/1997 | Valizadeh et al. | |
| 5,737,744 A | 4/1998 | Callison et al. | |
| 5,742,752 A | 4/1998 | DeKoning | |
| 5,819,292 A * | 10/1998 | Hitz et al. ............... | 707/203 |
| 5,819,310 A | 10/1998 | Vishlitzky et al. | |
| 5,828,876 A | 10/1998 | Fish et al. | |
| 5,835,953 A | 11/1998 | Ohran | |
| 5,907,672 A | 5/1999 | Matze et al. | |
| 5,948,110 A | 9/1999 | Hitz et al. | |
| 5,950,225 A | 9/1999 | Kleiman | |
| 5,956,745 A * | 9/1999 | Bradford et al. ........... | 360/48 |
| 5,963,962 A | 10/1999 | Hitz et al. | |
| 5,987,477 A * | 11/1999 | Schmuck et al. ........... | 707/10 |
| 6,000,039 A | 12/1999 | Tanaka et al. | |
| 6,038,570 A * | 3/2000 | Hitz et al. ............... | 707/204 |
| 6,038,639 A * | 3/2000 | O'Brien .................. | 711/114 |
| 6,061,770 A * | 5/2000 | Franklin ................. | 711/161 |
| 6,076,148 A | 6/2000 | Kedem | |
| 6,101,585 A | 8/2000 | Brown et al. | |
| 6,119,244 A | 9/2000 | Schoenthal et al. | |
| 6,138,126 A | 10/2000 | Hitz et al. | |
| 6,173,293 B1 * | 1/2001 | Thekkath et al. .......... | 707/201 |
| 6,175,900 B1 * | 1/2001 | Forin et al. .............. | 711/156 |
| 6,202,136 B1 * | 3/2001 | Wikle et al. .............. | 711/162 |
| 6,205,450 B1 * | 3/2001 | Kanome .................. | 707/203 |
| 6,289,356 B1 | 9/2001 | Hitz et al. | |
| 6,311,193 B1 * | 10/2001 | Sekido ................... | 707/202 |
| 6,317,844 B1 * | 11/2001 | Kleiman .................. | 714/6 |
| 6,374,268 B1 * | 4/2002 | Testardi .................. | 707/205 |
| 6,418,449 B1 * | 7/2002 | Chen et al. .............. | 707/104.1 |
| 6,434,681 B1 | 8/2002 | Armangau | |
| 6,460,054 B1 * | 10/2002 | Grummon ................. | 707/204 |
| 6,473,775 B1 * | 10/2002 | Kusters et al. ............ | 707/200 |
| 6,484,186 B1 * | 11/2002 | Rungta ................... | 707/203 |
| 6,529,995 B1 * | 3/2003 | Shepherd ................. | 711/114 |
| 6,604,118 B1 * | 8/2003 | Kleiman et al. ............ | 707/203 |
| 6,721,764 B1 | 4/2004 | Hitz et al. | |
| 6,748,504 B1 | 6/2004 | Sawdon et al. | |

FOREIGN PATENT DOCUMENTS

| | | |
|---|---|---|
| EP | 0 492 808 A2 | 7/1992 |
| EP | 0 497 067 A1 | 8/1992 |
| EP | 0537098 | 4/1993 |
| EP | 0 552 580 A2 | 7/1993 |
| EP | 0 569 313 A2 | 11/1993 |
| WO | WO 91/13404 A1 | 9/1991 |
| WO | WO 93/13475 A1 | 7/1993 |
| WO | WO 94/29796 A1 | 12/1994 |
| WO | WO 98/21656 A1 | 5/1998 |
| WO | WO 98/38576 A1 | 9/1998 |
| WO | WO 00/07104 A1 | 2/2000 |
| WO | WO 01/31446 A1 | 5/2001 |
| WO | WO 02/29573 A2 | 4/2002 |
| WO | WO 03/105026 A1 | 12/2003 |

OTHER PUBLICATIONS

David Hitz, An NFS File Server Appliance, Technical Report TR01, Aug. 1993.*

Chia Chao et al., "Mime: a High Performance Storage Device with Strong Recovery Guarantees", Concurrent Systems Project Hewlett-Packard Laboratories, Mar. 18, 1992.

Wiebren De Jonge, "The Logical Disk: A new Approach to Improving File Systems", Dept. of Mathematics and Computer Science, Vrije Universiteit, Amsterdam.

Jim Gray et al., "Parity Striping of Disc Arrays: Low-Cost Reliable Storage with Acceptable Throughput", Proceedings of the 16th VLDB Conference, Brisbane, Australia 1990.

Tandem Computers Inc., 19333 Vallco Parkway, Cupertino, California. XP000522459.

John H. Hartman, "The Zebra Striped Network File System", Computer Science Division, Electrical Engineering and Computer Sciences, University of California, Berkeley, California.

David Hitz, "File System Design for an NFS File Server Appliance", Technical Report 3002, Presented Jan. 19, 1994. USENIX Winter 1994, San Francisco, California.

David Hitz, "An NFS File Server Appliance", Technical Report TR01, Rev. A Aug. 1993.

IBM Technical Disclosure Bulletin, vol. 36, No. 03, Mar. 1993. XP000354845.

Steven R. Kleiman et al., "Using NUMA Interconnects for Highly Available Filers", 1999 IEEE.

Jai Menon et al., "The Architecture of a Fault-Tolerant Cached RAID Controller", IEEE Computer Society, Los Alamitos, California, May 16-19, 1993. XP000398988.

David Patterson et al., "A Case for Redundant Arrays of Inexpensive Disks (RAID)", Computer Science Division, Dept. of Electrical Engineering and Computer Sciences, University of California, Berkeley.

Slashdot, TUX 2: "The File System that Would Be King".

David Tweeten, "Hiding Mass Storage Under UNIX: Nasa's MSS-II Architecture", NAS System Division, NASA Ames Research Center, Moffett Filed, California, 1990 IEEEE.

* cited by examiner

INSTANT SNAPSHOT

BACKGROUND OF THE INVENTION

1. Field of Invention

This invention relates to data storage systems.

2. Related Art

Snapshots of a file system capture the contents of the files and directories in a file system at a particular point in time. Such snapshots have several uses. They allow the users of the file system to recover earlier versions of a file following an unintended deletion or modification. The contents of the snapshot can be copied to tape to provide a backup copy of the file system, and it can be copied to another file server and used as a replica. File systems, including the WAFL (Write Anywhere File Layout) file system, include a copy-on-write snapshot mechanism. Snapshot block ownership is recorded by updating the block's entry in the block map file, a bitmap associated with the vacancy of blocks.

One problem with the prior art of creating snapshots is that the requirement for additional file system metadata in the active filesystem to keep track of which blocks snapshots occupy. This metadata requires 4 bytes per 4-KB file system block, i.e., $1/1024^{th}$ of the file system. These methods are inefficient both in their use of storage space and in the time needed to create the snapshots.

A second problem with earlier snapshot implementations, was the time consuming steps of writing out a description of the snapshot state on creation and removing it on deletion.

A third problem with earlier copy-on-write mechanisms, was the required steps consumed a considerable amount of time and file system space. For example, some systems, such as those supplied with DCE/DFS include a copy-on-write mechanism for creating snapshots (called "clones"). The copy-on-write mechanism was used to record which blocks each clone occupied. Such systems require a new copy of the inode file and the indirect blocks for all files and directories are created when updating all of the original inodes.

Accordingly, it would be advantageous to provide an improved technique for more quickly and efficiently capturing the contents of the files and directories in the file system at a particular point in time. This is achieved in an embodiment of the invention that is not subject to the drawbacks of the related art.

SUMMARY OF THE INVENTION

The invention provides an improved method and apparatus for creating a snapshot of a file system.

In a first aspect of the invention, a "copy-on-write" mechanism is used. An effective snapshot mechanism must be efficient both in its use of storage space and in the time needed to create it because file systems are often large. The snapshot uses the same blocks as the active file system until the active file system is modified. Whenever a modification occurs, the modified data is copied to a new block and the old data is saved (henceforth called "copy-on-write"). In this way, the snapshot only uses space where it differs from the active file system, and the amount of work required to create the snapshot initially is small.

In a second aspect of the invention, a record of which blocks are being used by the snapshot is included in the snapshot itself, allowing effectively instantaneous snapshot creation and deletion.

In a third aspect of the invention, the state of the active file system is described by a set of metafiles; in particular, a bitmap (henceforth the "active map") describes which blocks are free and which are in use by the active file system. The inode file describes which blocks are used by each file, including the metafiles. The inode file itself is described by a special root inode, also known as the "fsinfo block." This copy of the root inode becomes the root of the snapshot. The root inode captures all required states for creating the snapshot such as the location of all files and directories in the file system. During subsequent updates of the active file system, the system consults the bitmap included in the snapshot (the "snapmap") to determine whether a block is free for reuse or belongs to a snapshot. This mechanism allows the active file system to keep track of which blocks each snapshot uses without recording any additional bookkeeping information in the file system.

In a fourth aspect of the invention, a snapshot can also be deleted instantaneously simply by discarding its root inode. Further bookkeeping is not required, because the snapshot includes it's own description.

In a fifth aspect of the invention, the performance overhead associated with the search for free blocks is reduced by the inclusion of a summary file. The summary file identifies blocks that are used by at least one snapshot; it is the logical OR of all the snapmap files. The write allocation code decides whether a block is free by examining the active map and the summary file. The active map indicates whether the block is currently in use in the active file system. The summary file indicates whether the block is used by any snapshot.

In a sixth aspect of the invention, the summary file is updated in the background after the creation or deletion of a snapshot. This occurs concurrently with other file system operations. Two bits are stored in the file system "fsinfo block" for each snapshot. These two bits indicate whether the summary file needs to be updated using the snapshot's snapmap information as a consequence of its creation or deletion. When a block is freed in the active file system, the corresponding block of the summary file is updated with the snapmap from the most recently created snapshot, if this has not already been done. An in-core bit map records the completed updates to avoid repeating them unnecessarily. This ensures that the combination of the active bitmap and the summary file will consistently identify all blocks that are currently in use. Additionally, the summary file is updated to reflect the effect of any recent snapshot deletions when freeing a block in the active file system. This allows reuse of blocks that are now entirely free. After updating the summary file following a snapshot creation or deletion, the corresponding bit in the fsinfo block is adjusted.

In a seventh aspect of the invention, the algorithm for deleting a snapshot involves examining the snapmaps of the deleted snapshot and the snapmaps of the next oldest and next youngest snapshot. A block that was used by the deleted snapshot but is not used by its neighbors can be marked free in the summary file, as no remaining snapshot is using it. However, these freed blocks cannot be reused immediately, as the snapmap of the deleted snapshot must be preserved until summary updating is complete. During a snapdelete free blocks are found by using the logical OR of the active bitmap, the summary file, and the snapmaps of all snapshots for which post-deletion updating is in progress. In other words, the snapmap of the deleted snapshot protects the snapshot from reuse until it is no longer needed for updating.

In the preferred embodiment, the invention is operative on WAFL file system. However, it is still possible for the invention to be applied to any computer data storage system

INCORPORATED DISCLOSURES

Figure 1:
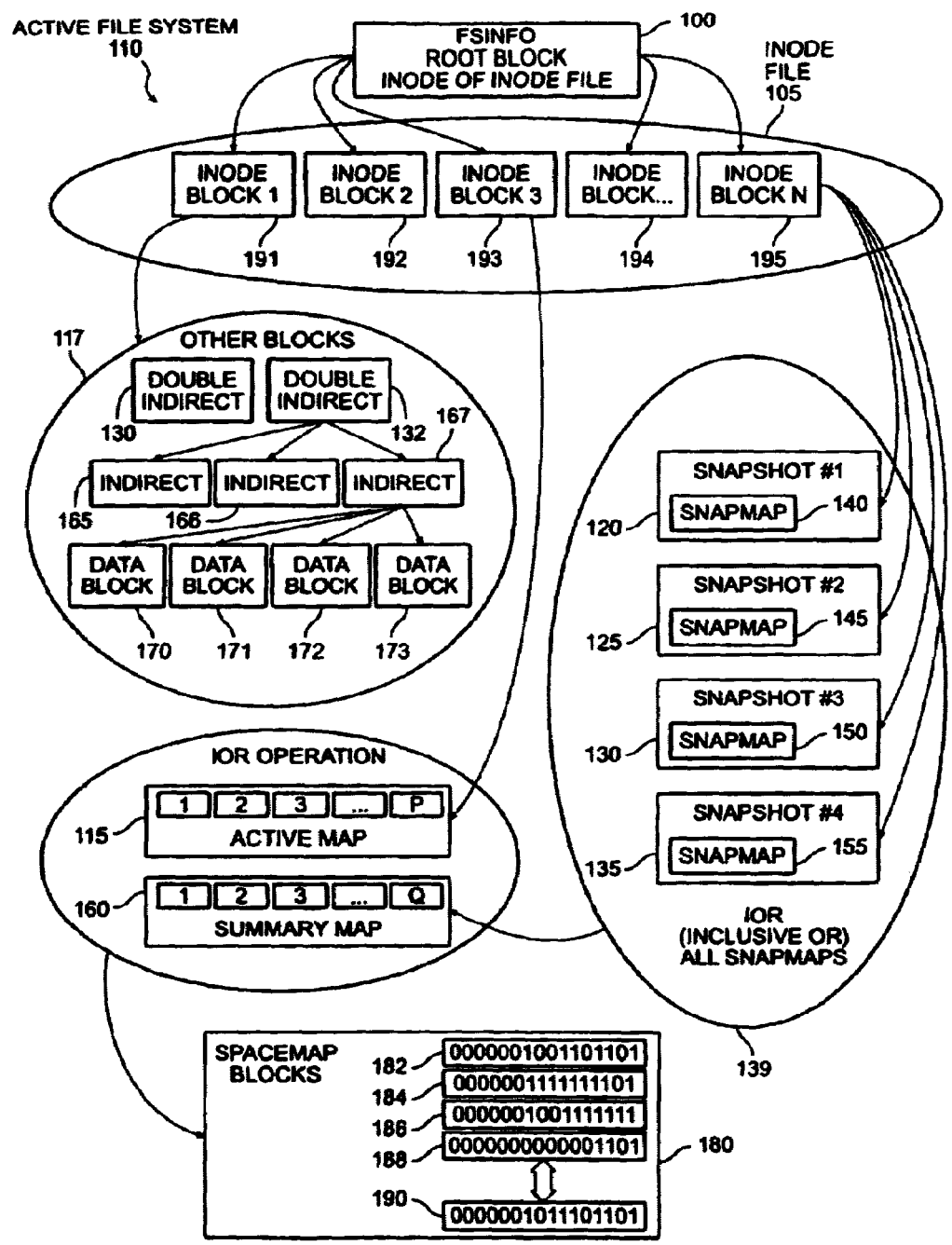
FIG. 1 shows a block diagram of a system for an instant snapshot.

The inventions described herein can be used in conjunction with inventions described in the following applications:

U.S. patent application Ser. No. 09/642,063, Express Mail Mailing No. EL 524781089US, filed Aug. 18, 2000, in the name of Blake LEWIS, titled "Reserving File System Blocks"

U.S. patent application Ser. No. 09/642,062, Express Mail Mailing No. EL524780242US, filed Aug. 18, 2000, in the name of Rajesh SUNDARAM, titled "Dynamic Data Storage"

U.S. patent application Ser. No. 09/642,066, Express Mail Mailing No. EL524780256US, filed Aug. 18, 2000, in the name of Ray CHEN, titled "manipulation of Zombie Files and Evil-Twin Files"

U.S. patent application Ser. No. 09/642,064, in the names of Scott SCHOENTHAL, Express Mailing Number EL524781075US, titled "Persistent and Reliable Delivery of Event Messages", assigned to the same assignee, and all pending cases claiming the priority thereof.

and

U.S. patent application Ser. No. 09/642,065, in the names of Douglas P. DOUCETTE, Express Mailing Number EL524781092US, titled "Improved Space Allocation in a Write Anywhere File System", assigned to the same assignee, and all pending cases claiming the priority thereof.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention might be implemented using a variety of other techniques without undue experimentation or further invention, and that such other techniques would be within the scope and spirit of the invention.

Lexicography

As used herein, use of the following terms refer or relate to aspects of the invention as described below. The general meaning of these terms is intended to be illustory and in no way limiting.

Inode—In general, the term "inode" refers to data structures that include information about files in Unix and other file systems. Each file has an inode and is identified by an inode number (i-number) in the file system where it resides. Inodes provide important information on files such as user and group ownership, access mode (read, write, execute permissions) and type. An inode points to the file blocks or indirect blocks of the file it represents.

Sector—In general, the term "sector" refers to a physical section of a disk drive including a collection of bytes, such as 512 bytes.

Data Storage Block—In general, the phrase "data storage block" refers to specific allocation areas on a hard disk. The allocation area is a collection of sectors, such as 8 sectors or 4,096 bytes, commonly called 4 K bytes or 4-KB.

File Block—In general, the phrase "file block" refers to a standard size block of data including some or all of the data in a file. In the preferred embodiment, the file block is the same size as a data storage block.

fsinfo (File System Information Block)—In general, the phrase "file system information block" refers to one or more copies of a block known as the "fsinfo block". These blocks are located at fixed locations on the disks. The fsinfo block includes data about the volume including the size of the volume, volume level options, language and more.

WAFL (Write Anywhere File Layout)—In general, the term "WAFL" refers to a high level structure for a file system. Pointers are used for locating data. All the data is included in files. These files can be written anywhere on the disk in chunks of file blocks placed in data storage blocks.

Volume In general, the term "volume" refers to a single file system. The file system may be composed of a collection of disk drives.

Consistency Point (CP)—In general, the term "CP" refers to a time that a file system reaches a consistent state. When this state is reached, all the files have been written to all the blocks and are safely on disk and the one or more copies of redundant fsinfo blocks get written out. If the system crashes before the fsinfo blocks go out, all other changes are lost and the system reverts back to the last CP. The file system advances atomically from one CP to the next.

Consistent State—In general, the phrase "consistent state" refers to the system configuration of files in blocks after the CP is reached.

Range—In general, the term "range" refers to a group of blocks, such as 1,024 blocks.

Active file system—In general, the phrase "active file system" refers to the current file system arrived at with the most recent CP. In the preferred embodiment, the active file system includes the active map, the summary map and points to all snapshots and other data storage blocks through a hierarchy of inodes, indirect data storage blocks and more.

Active map—In general, the phrase "active map" refers to a to a file including a bitmap associated with the vacancy of blocks of the active file system.

Snapshot—In general, the term "snapshot" refers to a copy of the file system. The snapshot diverges from the active file system over time as the active file system is modified. A snapshot can be used to return the file system to a particular CP (consistency point).

Snapmap—In general, the term "snapmap" refers to a file including a bitmap associated with the vacancy of blocks of a snapshot. The active map diverges from a snapmap over time as the blocks used by the active file system change during consistency points.

Summary map—In general, the term "summary map" refers to a file including an IOR (inclusive OR) bitmap of all the snapmaps.

Space map—In general, the term "space map" refers to a file including an array of numbers which describe the number of storage blocks used in an allocation area.

Blockmap—In general, the term "blockmap" refers to a map describing the status of the blocks in the file system.

Snapdelete—In general, the term "snapdelete" refers to an operation that removes a particular snapshot from the file system. This command can allow a storage block to be freed for reallocation provided no other snapshot or the active file system uses the storage block.

Snapcreate—In general, the term "snapcreate" refers to the operation of retaining a consistency point and preserving it as a snapshot.

As described herein, the scope and spirit of the invention is not limited to any of the definitions or specific examples shown therein, but is intended to include the most general concepts embodied by these and other terms.

System Elements

FIG. 1 shows a block diagram of a system for an instant snapshot.

The root block 100 includes the inode of the inode file 105 plus other information regarding the active file system 110, the active map 115, previous active file systems known as snapshots 120, 125, 130 and 135 and their respective snapmaps 140, 145, 150 and 155.

The active map 115 of the active file system 110 is a bitmap associated with the vacancy of blocks for the active file system 110. The respective snapmaps 140, 145, 150 and 155 are active maps that can be associated with particular snapshots 120, 125, 130 and 135. A summary map 160 is an inclusive OR of the snapmaps 140, 145, 150 and 155. Also shown are other blocks 117 including double indirect blocks 130 and 132, indirect blocks 165, 166 and 167 and data blocks 170, 171, 172 and 173. Finally, FIG. 1 shows the spacemap 180 including a collection of spacemap blocks of numbers 182, 184, 186, 188 and 190.

The root block 100 includes a collection of pointers that are written to the file system when the system has reached a new CP (consistency point). The pointers are aimed at a set of indirect (or triple indirect, or double indirect) inode blocks (not shown) or directly to the inode file 105 consisting of a set of blocks known as inode blocks 191, 192, 193, 194 and 195.

The number of total blocks determines the number of indirect layers of blocks in the file system. The root block 100 includes a standard quantity of data, such as 128 bytes. 64 of these 128 bytes describe file size and other properties; the remaining 64 bytes are a collection of pointers to the inode blocks 191, 192, 193, 194 and 195 in the inode file 105. Each pointer in the preferred embodiment is made of 4 bytes. Thus, there are approximately 16 pointer entries in the root block 100 aimed at 16 corresponding inode blocks of the inode file 105 each including 4 K bytes. If there are more than 16 inode blocks, indirect inode blocks are used.

In a preferred embodiment, file blocks are 4096 bytes and inodes are 128 bytes. It follows that each block of the inode file contains 32 (i.e. 4,096/128) separate inodes that point to other blocks 117 in the active file system.

Inode block 193 in the inode file 105 points to a set of blocks (1, 2, 3, . . . , P) called the active map 115. Each block in the active map 115 is a bitmap where each bit corresponds to a block in the entire volume. A "1" in a particular position in the bitmap correlates with a particular allocated block in the active file system 110. Conversely, a "0" correlates to the particular block being unused by the active file system 110.

Since each block in the active map 115 can describe up to 32 K blocks or 128 MB, 8 blocks are required per GB, 8 K blocks per TB.

Another inode block in the inode file 105 is inode block N 195. This block includes a set of pointers to a collection of snapshots 120, 125, 130 and 135 of the volume. Each snapshot includes all the information of a root block and is equivalent to an older root block from a previous active file system. The snapshot 120 may be created at any past CP. Regardless when the snapshot is created, the snapshot is an exact copy of the active file system at that time.

The newest snapshot 120 includes a collection of pointers that are aimed directly or indirectly to the same inode file 105 as the root block 100 of the active file system 110. As the active file system 110 changes (generally from writing files, deleting files, changing attributes of files, renaming file, modifying their contents and related activities), the active file system and snapshot will diverge over time. Given the slow rate of divergence of an active file system from a snapshot, any two snapshots will share many of the same blocks.

The newest snapshot 120 is associated with snapmap 140. Snapmap 140 is a bit map that is initially identical to the active map 115. The older snapshots 125, 130 and 135 have a corresponding collection of snapmaps 145, 150 and 155. Like the active map 115, these snapmaps 145, 150 and 155 include a set of blocks including bitmaps that correspond to allocated and free blocks for the particular CP when the particular snapmaps 145, 150 and 155 were created.

Any active file system may have a structure that includes pointers to one or more snapshots. Snapshots are identical to the active file system when they are created. It follows that snapshots contain pointers to older snapshots. There can be a large number of previous snapshots in any active file system or snapshot. In the event that there are no snapshot, there will be no pointers in the active file system.

Blocks not used in the active file system 110 are not necessarily available for allocation or reallocation because the blocks may be used by snapshots. Blocks used by snapshots are freed by removing a snapshot using the snapdelete command. When a snapshot is deleted any block used only by that snapshot and not by other snapshots nor by the active file system becomes free for reuse by WAFL. If no other snapshot or active files uses the block, then the block can be freed and written over during the next copy on-wrote-execution by WAFL. The system can relatively efficiently determine whether a block can be removed using the "nearest neighbor rule". If the previous and next snapshot do not allocate a particular block in their respective snapmaps, then the block can be freed for reuse by WAFL. For WAFL to find free space to write new data or metadata, it could search the active map 115 and the snapmaps (140, 145, 150 and 155) of the snapshots (120, 125, 130 and 135) to find blocks that are totally unused. This would be very inefficient; thus it is preferable to use the active map and the summary map as described below A summary map 160 is created by using an IOR (inclusive OR) operation 139 on the snapmaps 140, 145, 150 and 155. Like the active map 115 and the snapmaps 140, 145, 150 and 155, the summary map 160 is a file whose data blocks (1, 2, 3, . . . Q) contained a bit map. Each bit in each block of the summary map describes the allocation status of one block in the system with "1" being allocated and "0" being free. The summary map 160 describes the allocated and free blocks of the entire volume from all the snapshots 120, 125, 130 and 135 combined. The use of the summary file 160 is to avoid overwriting blocks in use by snapshots.

An IOR operation on sets of blocks (such as 1,024 blocks) of the active map 115 and the summary map 160 produces a spacemap 180. Unlike the active map 115 and the summary map 160, which are a set of blocks containing bitmaps, the spacemap 180 is a set of blocks including 182, 184, 186, 188 and 190 containing arrays of binary numbers. The binary numbers in the array represent the addition of all the vacant blocks in a region containing a fixed number of blocks, such as 1,024 blocks. The array of binary numbers in the single spacemap block 181 represents the allocation of all blocks for all snapshots and the active file system in one range of 1,024 blocks. Each of the binary numbers 182, 184, 186, 188 and 190 in the array are a fixed length. In a preferred embodiment, the binary numbers are 16 bit numbers, although only 10 bits are used.

In a preferred embodiment, the large spacemap array binary number 182 (0000001111111110=1,021 in decimal units) tells the file system that the corresponding range is relatively full. In such embodiments, the largest binary number 0000111111111111 (1,023 in decimal) represents a range containing at most one empty block. The small binary number 184 (0000000000001110=13 in decimal units) instructs the file system that the related range is relatively empty. The spacemap 180 is thus a representation in a very compact form of the allocation of all the blocks in the volume broken into 1,024 block sections. Each 16 bit number in the array of the spacemap 180 corresponds to the allocations of blocks in the range containing 1,024 blocks or about 4 MB. Each spacemap block 180 has about 2,000 binary numbers in the array and they describe the allocation status for 8 GB. Unlike the summary map 120, the spacemap block 180 needs to be determined whenever a file needs to be written.

Figure 2:
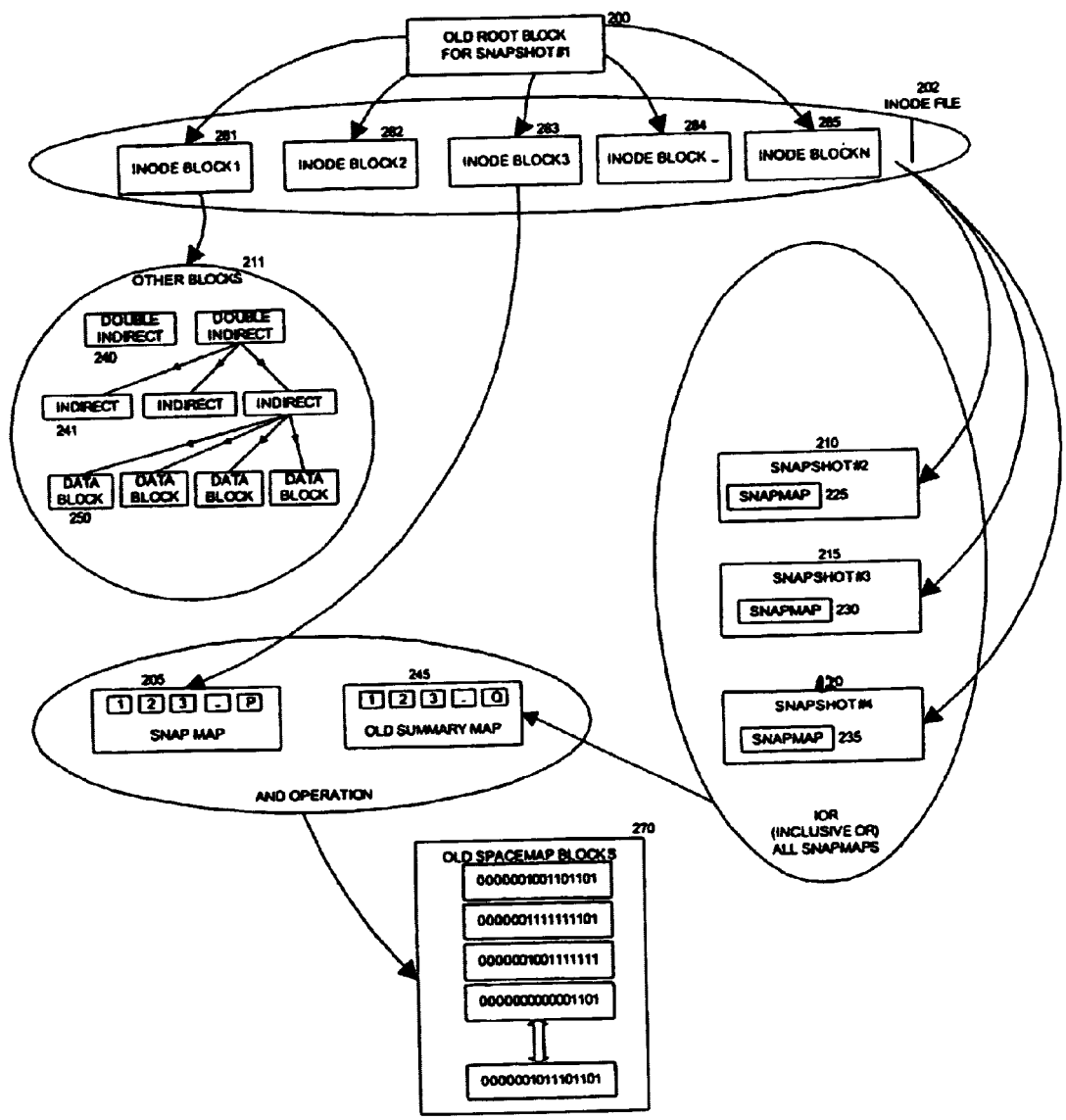
FIG. 2 shows a block diagram of an instant snapshot.

FIG. 2 shows a block diagram of an instant snapshot.

The old root block 200 of snapshot #1 201 includes the inode of the inode file 202 plus other information regarding the previous active file system known as snapshot #1 201, the snap map 205, earlier active file systems known as snapshot #2 210, snapshot #3 215 and snapshot #4 220, and their respective snapmaps 225, 230 and 235.

The snapmap 205 of the previous active file system, snapshot #1 201, is a bitmap associated with the vacancy of blocks for snapshot #1 201. The respective snapmaps 225, 230 and 235 are earlier active maps that can be associated with particular snapshots 210, 215 and 220. A summary map 245 is an inclusive OR of the snapmaps 225, 230 and 235. Also shown are other blocks 211 including double indirect blocks 240 and 241, indirect blocks 250, 251 and 252, and data blocks 260, 261, 262, and 263. Finally, FIG. 2 shows the spacemap 270 of snapshot #1 201 including a collection of spacemap blocks of binary numbers.

The old root block 200 includes a collection of pointers that were written to the previous active file system when the system had reached the previous CP. The pointers are aimed at a set of indirect (or triple indirect, or double indirect) inode blocks (not shown) or directly to the inode file 202 consisting of a set of blocks known as inode blocks 281, 282, 283, 284 and 285.

An inode block 281 in the inode file 202 points to other blocks 211 in the old root block 200 starting with double indirect blocks 240 and 241 (there could also be triple indirect blocks). The double indirect blocks 240 and 241 include pointers to indirect blocks 250, 251 and 252. The indirect blocks 250, 251 and 252 include pointers that are directed to data leaf blocks 260, 261, 262, and 263 of the snapshot #1 201.

Inode block 283 in the inode file 202 points to a set of blocks (1, 2, 3, . . . , P) called the snap map 205. Each block in the snap map 205 is a bitmap where each bit corresponds to a block in the entire volume. A "1" in a particular position in the bitmap correlates with a particular allocated block in the snapshot #1 201. Conversely, a "0" correlates to the particular block being free for allocation in the old root block 200. Each block in the snap map 205 can describe up to 32 K blocks or 128 MB.

Inode file 202 also includes inode block N 285. This block includes a set of pointers to a collection of earlier snapshots, snapshot #2 210, snapshot #3 215 and snapshot #4 220 of the volume. Each snapshot includes all the information of a root block and is equivalent to an older root block from a previous active file system.

Snapshot #1 201 also includes an old summary map 245 and old spacemap blocks 270. Although these blocks of data are included in snapshot #1 201 and previous snapshots, in a preferred embodiment, this data is not used by the active file system.

Method of Use

Figure 3:
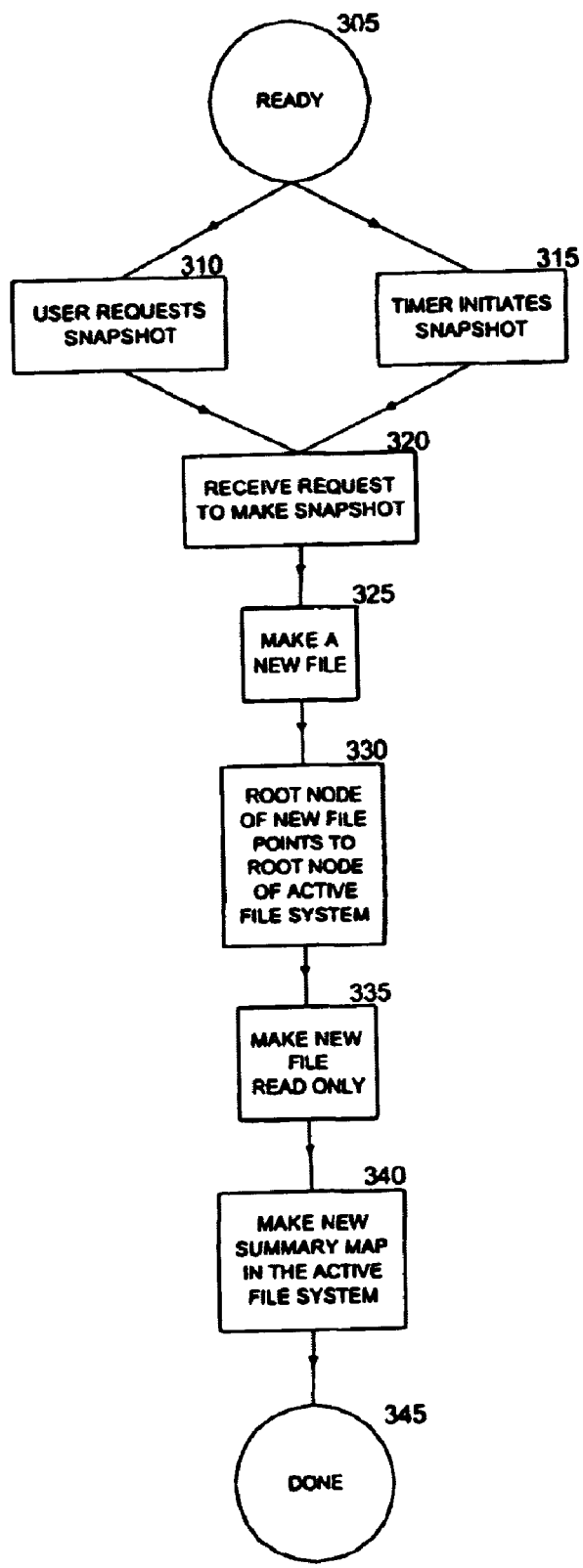
FIG. 3 shows a flow diagram of a method for creating a snapshot.

FIG. 3 shows a flow diagram of a method for using a system as shown in FIG. 1.

A method 300 is performed by the file system 110. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 305, the file system 110 is ready to perform a method 300.

At a step 310, a user will request a snapshot of the file system 110.

At a step 315, a timer associated with the file system 110 initiates the creation of a new snapshot.

At a step 320, the file system 110 receives a request to make a snapshot.

At a step 325, the file system 110 creates a new file.

At a step 335, the file system 110 makes the file read only.

At a step 340, the file system 110 updates the new summary map by using an inclusive OR of the most recent snapmap and the existing summary file. This step must be done before any blocks are freed in the corresponding active map block. If multiple snapshots are created such that the processing overlaps in time, the update in step 340 need only be done for the most recently created snapshot.

At a flow point 345, the snapshot create and the summary file update is completed and the snapshot creation is done.

An analogous method may be performed for snapshot delete.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. A method of capturing the contents of files and directories in a file system, said file system comprising a set of storage blocks for plural files in a mass storage system including steps of recording an active map in said file system of said storage blocks used by said plural files in said active file system;

recording a consistency point in said file system including a consistent version of said plural files in said file system at a previous time, said consistency point including a copy of said active map at said previous time;

refraining from writing data to storage blocks in response to said active map and at least one said copy of said active map included in said consistency point; and generating a summary map by performing a logical OR operation with at least one said copy of said active map included in said consistency point.

2. A method as in claim 1, wherein said step of refraining includes determining a logical union of said storage blocks used by one or more of said copies of said active map included in said consistency point.

3. A method as in claim 1, wherein said step of refraining includes determining a subset of said storage blocks used by one or more of said copies of said active map included in said consistency point.

4. A method as in claim 1, wherein said file system is a WAFL file system.

5. A method as in claim 1, wherein said active map included in said consistency point is a snapmap.

6. A method as in claim 5, further including the step of removing a root inode of said snapmap using a snap delete.

7. A method as in claim 6, further including steps of determining not to write to a block after said step of removing, provided a previous or next snapmap uses said block.

8. A method as in claim 1, further including steps of copying modified data to a new block and saving old data in a current data block so as to implement a copy-on-write mechanism.

9. A method as in claim 1, wherein said step of refraining from writing data to said storage blocks is accomplished by being responsive to said summary map.

10. A file system comprising:

a set of storage blocks for plural files in a mass storage system;

an active map in said file system of said storage blocks used by said plural files in said active file system; and a consistency point recorded in said file system, said consistency point including a consistent version of said plural files in said file system at a previous time and a copy of said active map at said previous time;

wherein said file system refrains from writing data to storage blocks in response to said active map and at least one said copy of said active map included in said consistency point; and wherein said file system generates a summary map by performing a logical OR operation with at least one said copy of said active map included in said consistency point.

11. A file system as in claim 10, wherein in order to determine to refrain from writing said data, said file system determines a logical union of said storage blocks used by one or more of said copies of said active map included in said consistency point.

12. A file system as in claim 10, wherein in order to determine to refrain from writing said data, said file system determines a subset of said storage blocks used by one or more of said copies of said active map included in said consistency point.

13. A file system as in claim 10, wherein said file system is a WAFL file system.

14. A file system as in claim 10, wherein said active map included in said consistency point is a snapmap.

15. A file system as in claim 14, wherein said file system removes a root inode of said snapmap using a snap delete.

16. A file system as in claim 15, wherein after said file system removes said root inode of said snapmap, said file system determines not to write to a block provided a previous or next snapmap uses said block.

17. A file system as in claim 10, wherein said file system further includes a copy-on-write mechanism that copies modified data to a new block and saves old data in a current data block.

18. A file system as in claim 10, wherein said file system refrains from writing data to said storage blocks responsive to said summary map.

19. A memory storing information including instructions, the instructions executable by a processor to capture the contents of files and directories in a file system, said file system comprising a set of storage blocks for plural files in a mass storage system, the instructions comprising the steps of: (a) recording an active map in said file system of said storage blocks used by said plural files in said active file system, (b) recording a consistency point in said file system including a consistent version of said plural files in said file system at a previous time, said consistency point including a copy of said active map at said previous time, (c) refraining from writing data to storage blocks in response to said active map and at least one said copy of said active map included in said consistency point, and (d) generating a summary map by performing a logical OR operation with at least one said copy of said active map included in said consistency point.

20. A memory as in claim 19, wherein said step of refraining includes determining a logical union of said storage blocks used by one or more of said copies of said active map included in said consistency point.

21. A memory as in claim 19, wherein said step of refraining includes determining a subset of said storage blocks used by one or more of said copies of said active map included in said consistency point.

22. A memory as in claim 19, wherein said file system is a WAFL file system.

23. A memory as in claim 19, wherein said active map included in said consistency point is a snapmap.

24. A memory as in claim 23, wherein the instructions further include the step of removing a root inode of said snapmap using a snap delete.

25. A memory as in claim 24, wherein the instructions further include steps of determining not to write to a block after said step of removing, provided a previous or next snapmap uses said block.

26. A memory as in claim 19, wherein the instructions further include steps of copying modified data to a new block and saving old data in a current data block so as to implement a copy-on-write mechanism.

27. A memory as in claim 19, wherein said step of refraining from writing data to said storage blocks is accomplished by being responsive to said summary map.

* * * * *